United States Patent
Narita et al.

[11] Patent Number: 5,962,944
[45] Date of Patent: Oct. 5, 1999

[54] PERMANENT MAGNET ROTOR TYPE ELECTRIC MOTOR

[75] Inventors: Kenji Narita; Takashi Suzuki; Hiroyuki Okudera; Yuji Kawai; Yuji Souma; Koji Kawanishi; Yoshichika Fukuda, all of Kawasaki, Japan

[73] Assignee: Fujitsu General Limited, Kawasaki, Japan

[21] Appl. No.: 09/175,774

[22] Filed: Oct. 20, 1998

[30] Foreign Application Priority Data

Oct. 24, 1997 [JP] Japan ................................ 9-309660
Oct. 9, 1998 [JP] Japan ................................ 10-288327

[51] Int. Cl.⁶ .................................................. H02K 21/14
[52] U.S. Cl. .......................... 310/156; 310/193; 310/114; 310/112; 310/162; 310/261; 310/216
[58] Field of Search .................................... 310/156, 261, 310/193, 114, 112, 216, 162

[56] References Cited

U.S. PATENT DOCUMENTS

| | | | |
|---|---|---|---|
| 4,127,786 | 11/1978 | Volkrodt | 310/156 |
| 4,795,936 | 1/1989 | Crosetto | 310/156 |
| 4,916,346 | 4/1990 | Kilman | 310/216 |
| 4,922,152 | 5/1990 | Gleghorn | 310/156 |
| 5,097,166 | 3/1992 | Mikulic | 310/156 |
| 5,182,483 | 1/1993 | hibino | 310/216 |
| 5,369,325 | 11/1994 | Nagate | 310/156 |
| 5,378,953 | 1/1995 | Uchida | 310/156 |
| 5,508,576 | 4/1996 | Nagate | 310/156 |
| 5,510,662 | 4/1996 | Tanimoto | 310/156 |
| 5,666,015 | 9/1997 | Uchibori | 310/261 |
| 5,679,995 | 10/1997 | Nagate | 310/156 |
| 5,841,212 | 11/1998 | Mita | 310/156 |
| 5,844,344 | 12/1998 | Uetake | 310/156 |

*Primary Examiner*—Nestor Ramirez
*Assistant Examiner*—Saeed Ghahramani
*Attorney, Agent, or Firm*—Kanesaka & Takeuchi

[57] ABSTRACT

In a permanent magnet rotor type electric motor having a stator core generating a rotation magnetic field and provided therein with a rotor core in which each magnetic pole is formed by a permanent magnet, the rotor core is fabricated by coaxially and unitedly joining a first core member and a second core member, in which a first permanent magnet of a predetermined cross-section shape is embedded per magnetic pole in the first core member, and a second permanent magnet which is made of a different material and has a different cross-section shape from those of the first permanent magnet is embedded per magnetic pole in the second core member, thereby achieving the permanent magnet rotor type electric motor having the performance and size appropriate for the intended use.

16 Claims, 16 Drawing Sheets

PERMANENT MAGNET ROTOR TYPE ELECTRIC MOTOR

BACKGROUND OF THE INVENTION

1. Field of the Invention

This invention relates to an electric motor having a permanent magnet in a rotor, such as Brushless DC motor, and more specifically, to an electric motor appropriate for the use as, for example, a driving source of a compressor of an air conditioner or the like, and capable of achieving a performance, size and production cost relative to its usage.

2. Description of the Related Art

In an electric motor such as Brushless DC motor, permanent magnets are embedded in a core of an inner rotor thereof, of which conventional examples are shown in FIG. 23 and FIG. 24. Incidentally, each drawing is a plane view of the inside of the electric motor shown from a plane perpendicular to the rotation axis thereof.

In the conventional example shown in FIG. 23, a rotor core 2 is disposed in a stator core 1 having, for example, 24 slots in which a field magnet rotates. The number of poles of the above electric motor is four, so that four permanent magnets 3 are arranged in the rotor core in accordance with the number of poles.

Each permanent magnet 3 is formed in a band plate shape of rectangular cross-section, and each pair of permanent magnets 3 as the south poles and the north poles is arranged across from each other along a direction perpendicular to a diameter line of the rotor core 2 on the outer circumference side of the rotor core 2. Each permanent magnet 3 is embedded in the rotor core 2 in a direction orthogonal to paper drawn with FIG. 23.

Between the two permanent magnets 3, a hole 4 as flux barrier is formed for avoiding short-circuiting and leaking the magnetic flux occurring between the adjacent permanent magnets. In this case, the hole 4 is represented as a triangle-shaped hole and located at each end of each permanent magnet 3. In the central portion of the rotor core 2, a center hole 5 is opened to pass a rotation shaft (not shown) therethrough.

In this point, when the magnetic flux distribution in a gap portion (between teeth of the stator core 1 and the permanent magnets 3) caused by each permanent magnet 3 is in a sine wave state, torque T of the electric motor is given as $T = Pn\{\Phi a \cdot Ia \cdot \cos \beta - 0.5 (Ld-Lq) \cdot Ia^2 \cdot \sin 2\beta\}$, where $\Phi a$ is an armature flux-linkage caused by the permanent magnet 3 on the d and q coordinate axes, Ld and Lq are the d-axis inductance and the q-axis inductance respectively, Ia is amplitude of an armature current on the d and q coordinate axes, $\beta$ is a lead angle of the armature current from the q axis on the d and q coordinate axes, and Pn is a pole-logarithm.

In the above expression, the first term expresses a magnet torque generated by the permanent magnets 3 and the second term expresses a reluctance torque generated by the difference between the d-axis inductance and the q-axis inductance. Refer to a treatise published in T. IEE Japan, vol. 117-D, No. 8. 1997 for further detail.

In the rotor core 2 shown in FIG. 24 as another conventional example, a permanent magnet 6 of arc-shaped cross-section is used, of which torque T is also given by the aforementioned expression.

Permanent magnets are embedded in number according to the number of poles in a rotor core. In most cases, the conventional art has used only a type of permanent magnet, for example, one of a ferrite magnet and a rare-earth magnet. Therefore, the flexibility in design is a low degree, and size and performance in torque, efficiency and so on are prone to be standardized; moreover production cost is directly determined by the permanent magnet used.

For example, where the permanent magnet 3 as a magnetic pole of the rotor core 2 shown in FIG. 23 is made of a rare-earth magnet, a smaller size and a higher performance can be achieved but the cost is high. On the other hand, where the permanent magnet 6 as a magnetic pole of the rotor core 2 shown in FIG. 24 is made of a ferrite magnet, the cost is lower but to acquire the equivalent performance to that of the rare-earth magnet, the diameter of the rotor core 2 needs to be increased.

The ferrite magnet is inexpensive and allows to form the permanent magnet in various configurations by reason of its ease of shaping, but the magnetic flux density is low, therefore hindering the reduction in size of the rotor core. On the other hand, although the rare-earth magnet has a high magnetic flux density and the reduction in size of the rotor core can be easy, the configuration of the permanent magnet is limited by the difficulties of shaping thereof. In addition, the rare-earth magnet has a higher cost than the ferrite magnet.

As described hereinbefore, in the conventional art, since a type of permanent magnet is used for magnetic poles in a rotor core, the range of choice in the performance, size and cost is limited, resulting in the difficulty in obtaining an electric motor appropriate for the required use.

SUMMARY OF THE INVENTION

To solve the aforementioned disadvantages, an object of the present invention is to provide a permanent magnet rotor type electric motor having proper performance and size consistent with the intended use, and also achieving a reasonable cost.

According to the present invention, the object is attained by a structure in which, in a permanent magnet rotor type electric motor, having a stator core generating a rotation magnetic field and provided therein with a rotor core in which each magnetic pole is formed by a permanent magnet, the rotor core comprises a first core member and a second core member which are unitedly joined together at the same axis with respect to the rotation axis of the rotor core, a first permanent magnet of a predetermined cross-section shape being embedded per magnetic pole in the first core member, and a second permanent magnet, which is made of a different material and has a different cross-section shape from those of the first permanent magnet, being embedded per magnetic pole in the second core member.

For example, by using a ferrite magnet for the first permanent magnet and a rare-earth magnet for the second permanent magnet, the performance can be in an intermediate state between where the magnetic poles are formed by only the ferrite magnet and where the magnetic poles are formed by only the rare-earth magnet.

In this case, by changing the ratio of the first core member and the second core member with respect to the rotor core, the permanent magnet rotor type electric motor having performance, size and cost appropriate for various uses, can be obtained.

In the present invention, the side faces of the first core member and the second core member are in flush contact with each other so that they are coaxially joined together, and the second permanent magnet of the second core member is preferably disposed within a shadow area of a cross-section shape of the first permanent magnet, embedded in the first core member, seeing from the first core member, which is also one of features of the present invention.

According to the aforementioned structure, on the contact face between the first core member and the second core member, the first and second permanent magnets act as flux barrier against each other.

Multiple formations are included in the scope of the present invention as follows:

As the first formation, in the first core member, the first permanent magnet has a sectional fan shape. In the second core member, the second permanent magnet is formed in a sectional rectangular shape, and placed along a direction perpendicular to a diameter line of the rotor core on the outer circumference side of the rotor core, and additionally, a pair of flux barrier holes is formed at the ends of the second permanent magnet, in which the second permanent magnet and the flux barrier holes are arranged within the shadow area of the sectional fan shape of the first permanent magnet. According to the above formation, the magnetic flux from the stator core easily enter the second core member, so that the reluctance torque can be increased. Moreover, the short-circuiting and leaking of magnetic flux can be avoided due to the flux barrier hole.

Modifying the above first formation, the second permanent magnet can be placed on the inner circumference side of the rotor core, and a pair of flux barrier holes, extending in a slit shape toward the outer circumference of the rotor core along a diameter line of the rotor core, can be formed at the ends of the second permanent magnet (the second formation).

As the third formation, in the first core member, the first permanent magnet has a sectional fan shape. In the second core member, two second magnet pieces of rectangular cross-section are used as the second permanent magnet, and arranged at an angle to decrease in space toward the ends of the two second magnet pieces which are oriented toward the center of the rotor core, and additionally, flux barrier holes are formed at the other ends of the second magnet pieces, in which the two second magnet pieces and the flux barrier holes are arranged within the shadow area of the sectional fan shape of the first permanent magnet. According to the above formation, the two second magnet pieces as the second permanent magnet are arranged along a curve line of a magnetic circuit of magnetic flux from the stator core, so that the magnetic resistance of the magnetic circuit can be smaller, whereby the reluctance torque can be increased.

As the fourth formation, in the first core member, two first magnet pieces of rectangular cross-section are used as the first permanent magnet, and each placed along an interface between the magnetic poles, and additionally, a first flux barrier hole is formed between ends of the two first magnet pieces on the inner circumference side of the core. In the second core member, two second magnet pieces of rectangular cross-section are also used as the second permanent magnet, and each placed along an interface between the magnetic poles, and additionally, a second flux barrier hole is formed between ends of the two second magnet pieces on the inner circumference side of the core, in which the two second magnet pieces and the second flux barrier hole are arranged within each shadow area of the two first magnet pieces of the first permanent magnet and the first flux barrier hole. According to the above formation, the magnetic flux from the stator core easily enters both of the first and second core members, so that the magnetic resistance with respect to the magnetic flux entering from the stator core can be decreased similar to the third formation, thereby increasing the reluctance torque.

As the fifth formation, in the first core member, the first permanent magnet is formed as a sectional arc shape and is placed to orient the convexity thereof toward the center of the rotor core. In the second core member, two second magnet pieces of rectangular cross-section are used as the second permanent magnet, and arranged at an angle to decrease in space toward the ends of the two second magnet pieces which are oriented toward the center of the rotor core, and additionally, a flux barrier hole is formed at the other end of each second magnet piece, in which the two second magnet pieces and the flux barrier holes are arranged within the shadow area of the sectional arc shape of the first permanent magnet. Thereby, similar to the aforementioned formations, the magnetic resistance with respect to the magnetic flux entering from the stator core can be smaller, so that the reluctance torque can be increased.

The aforementioned effects can be obtained in the sixth to eleventh formations, which will be described hereinafter.

As the sixth formation, in the first core member, the first permanent magnet is formed as a sectional arc shape and is placed to orient the convexity thereof toward the center of the rotor core. In the second core member, the second permanent magnet is formed as in a sectional rectangular shape and placed along a direction perpendicular to a diameter line of the rotor core on the outer circumference side of the rotor core, and additionally, a pair of flux barrier holes is formed at the ends of the second permanent magnet, in which the second permanent magnet and the flux barrier holes are arranged within the shadow area of the sectional art shape of the first permanent magnet.

As the seventh formation, in the first core member, the first permanent magnet is formed as a sectional arc shape and placed to orient the convexity thereof toward the center of the rotor core. In the second core member, the second permanent magnet is shaped in a sectional rectangular shape and placed along a direction perpendicular to a diameter line of the rotor core on the inner circumference side of the rotor core, and additionally, a pair of flux barrier holes, extending in a slit shape toward the outer circumference of the rotor core along a diameter line of the rotor core, is formed at the ends of the second permanent magnet, in which the second permanent magnet and the flux barrier holes are arranged within the shadow area of the sectional art shape of the first permanent magnet.

As the eighth formation, in the first core member, the first permanent magnet is shaped in a sectional arc shape and is placed to orient the convexity thereof along the outer circumference of the rotor core. In the second core member, the second permanent magnet is shaped in a sectional rectangular shape and placed along a direction perpendicular to a diameter line of the rotor core on the outer circumference side of the rotor core, and additionally, a pair of flux barrier holes is formed at the ends of the second permanent magnet, in which the second permanent magnet and the flux barrier holes are arranged within the shadow area of the sectional art shape of the first permanent magnet.

As the ninth formation, in the first core member, the first permanent magnet has a sectional fan shape. In the second core member, the second permanent magnet is composed of two second magnet pieces of rectangular cross-section each of which is disposed along an interface between the magnetic poles, and additionally, a flux barrier hole is formed between the ends of the two second magnet pieces on the inner circumference side of the core, in which the two second magnet pieces and the flux barrier hole are arranged within the shadow area of the sectional fan shape of the first permanent magnet.

As the tenth formation, in the first core member, two first magnet pieces of rectangular cross-section are used as the first permanent magnet and each disposed along an interface between the magnetic poles, and additionally, a flux barrier hole is formed between the ends of the two first magnet pieces on the inner circumference side of the core. In the second core member, two second magnet pieces of rectangular cross-section are used as the second permanent magnet and arranged at an angle to decrease in space toward the ends of the two second magnet pieces which are oriented toward the center of he rotor core, in which the two second magnet pieces are respectively arranged within the shadow areas of the two first magnet pieces of the first permanent magnet.

Furthermore, as the eleventh formation, in the first core member, two first magnet pieces of rectangular cross-section are used as the first permanent magnet and arranged at an angle to decrease in space toward the ends of the two first magnet pieces which are oriented toward the center of the rotor core, and additionally, a flux barrier hole is formed between the ends of the two first magnet pieces on the inner circumference side of the core. In the second core member, two second magnet pieces of rectangular cross-section are used as the second permanent magnet and arranged at an angle to decrease in space toward the ends of the two second magnet pieces which are oriented toward the center of the rotor core, in which the two second magnet pieces are respectively arranged within the shadow areas of the two first magnet pieces of the first permanent magnet.

As magnet materials used in the present invention, preferably, the first permanent magnet in the first core member is made of a ferrite magnet; and the second permanent magnet in the second core member is made of a rare-earth magnet. The ferrite magnet and the rare-earth magnet can be effortlessly obtained, so that the permanent magnet rotor type electric motor relating to the present invention can be readily achieved.

In the present invention, the first and second core members are each made up by a laminated body of magnetic steel plates having a hole for embedding of the permanent magnet and the flux barrier hole which are stamped out by pressing, in which preferably, regarding the magnetic steel plate for the first core member, the hole for embedding of the permanent magnet and the flux barrier hole of the first core member are stamped out to replace the hole for embedding of the permanent magnet and the flux barrier hole of the second core member.

More specifically, the hole for embedding of the permanent magnet and the flux barrier hole in the second core member are defined in the shadow area of the hole for embedding of the permanent magnet and the flux barrier hole in the first core member, and each size of the hole for embedding of the permanent magnet and the flux barrier hole in the second core member is smaller than that of the hole for embedding of the permanent magnet and the flux barrier hole in the first core member.

Thus, in fabricating the rotor core, at the outset, the hole for the embedding of the permanent magnet and the flux barrier hole for the second core member are stamped out on all core materials (magnetic steel plates) used for fabricating the rotor core. After that, the hole for embedding the permanent magnet and the flux barrier hole for the first core member are stamped out on a part of all the core materials, which is required for forming the first core member, to replace the holes for embedding of the permanent magnet and the flux barrier hole which have been stamped out for the second core member at the first step. In this manner, production cost is not much increased, and the core laminated body made of the magnetic steel plate can be obtained efficiently. Note that, thereafter, the permanent magnet is embedded in the core laminated body and the polarization is given.

The present invention is appropriate for Brushless DC motor used for driving a compressor of an air conditioner, in which the performance of the air conditioner can be increased.

BRIEF DESCRIPTION OF THE DRAWINGS

The present invention will be described further hereinafter, by way of example only, with reference to the accompanying drawings in which.

DETAILED DESCRIPTION OF THE PREFERRED EMBODIMENT(S)

The first embodiment of a permanent magnet rotor type electric motor according to the present invention will be described below with reference to FIG. 1 to FIG. 4. The permanent magnet rotor type electric motor is composed of a stator core 17 generating a rotation magnetic field, and a rotor core 10 which is rotatably provided in the stator core 17. In the embodiment, the stator core 17 has 24 slots and is provided with armature winding in three phases (U-phase, V-phase and W-phase). In this point, the armature winding positioned on the outer circle side is the U phase, the armature winding positioned on the inner circle side is the W phase, and the armature winding between the U and W phases is the V phase. The number of slots and the form of the armature winding can be selectively decided.

Figure 2:
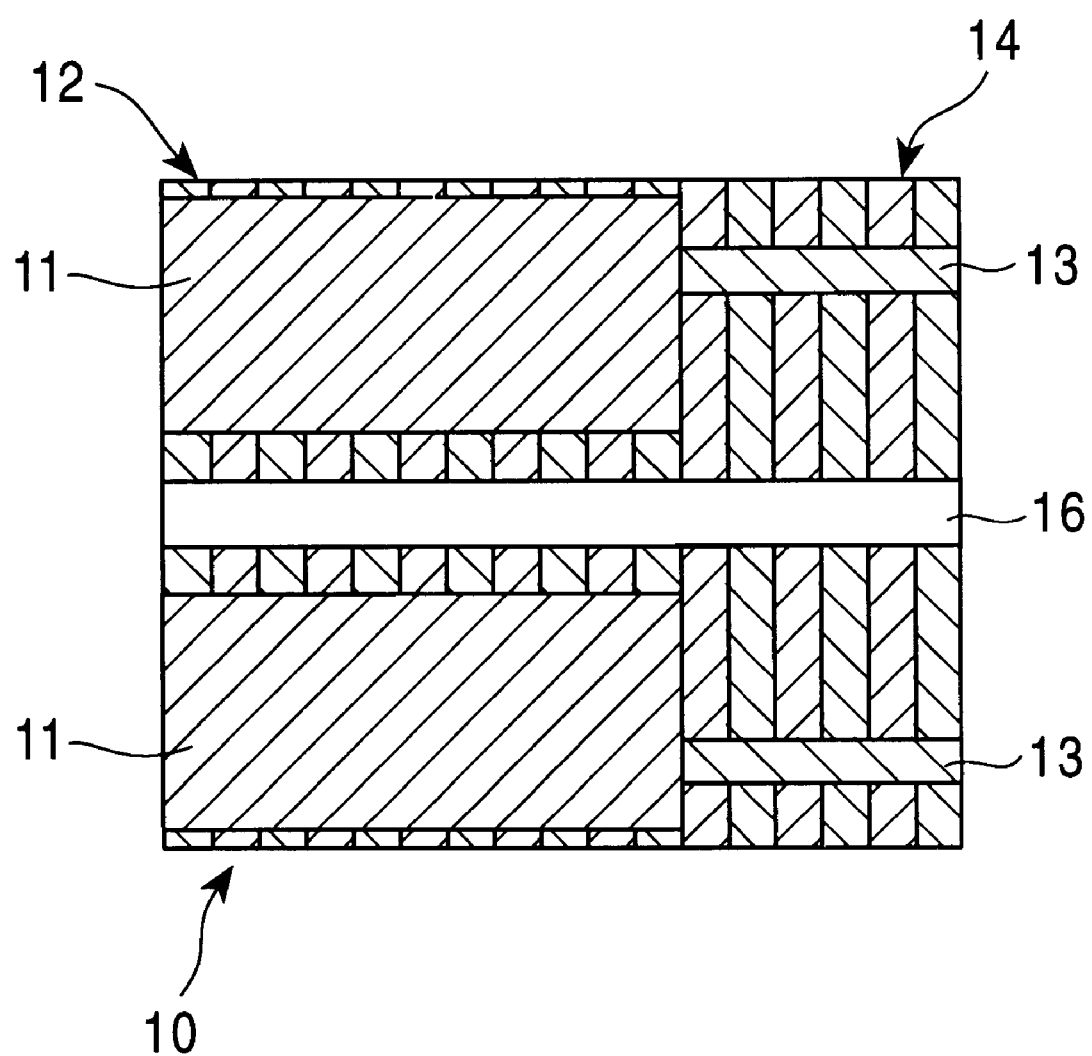
FIG. 2 is a sectional view taken along the d-axis of a rotor core applied in the first embodiment of FIG. 1.

As shown in a sectional view of FIG. 2, the rotor core 10 is constructed by coaxially joining a first core member 12 in which first permanent magnets 11 are embedded to a second core member 14 in which second permanent magnets 13 are embedded. At the rotative center of the rotor core 10, a center hole 16 for passing a rotating shaft (not shown) is opened.

In the embodiment, the first permanent magnet 11 is made of a ferrite magnet, and the second permanent magnet 13 is made of a rare-earth magnet.

Figure 3:
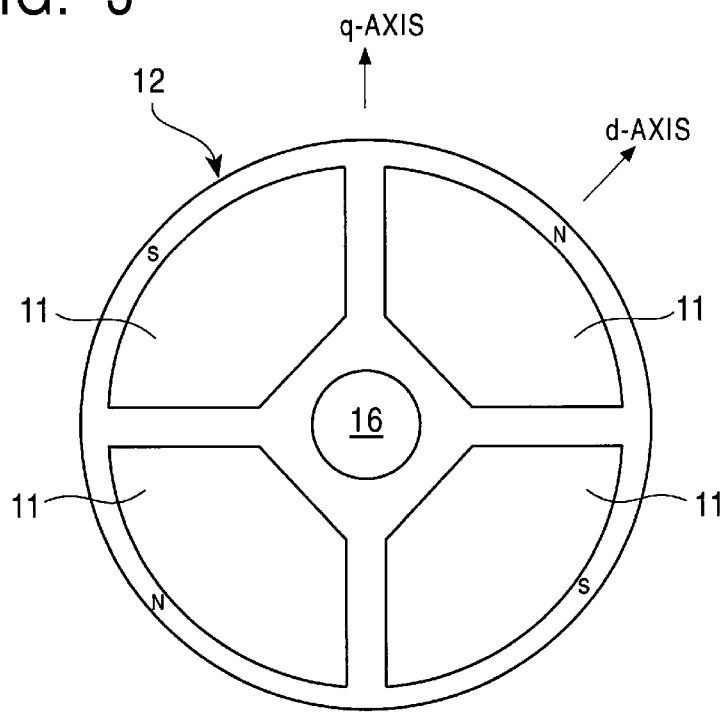
FIG. 3 is a plane view of a first core member constituting the rotor core in FIG. 3.

As shown in FIG. 3, the first permanent magnet 11 is formed in a sectional fan shape and embedded in the first core member 12 in number in accordance with the number of poles (four poles in the embodiment) of the motor at regular spaced-intervals along the circumferential direction. Accounting for the sectional fan shape of the first permanent magnet 11, an occupying percentage of magnet in the first core member 12 is extremely high.

Figure 4:
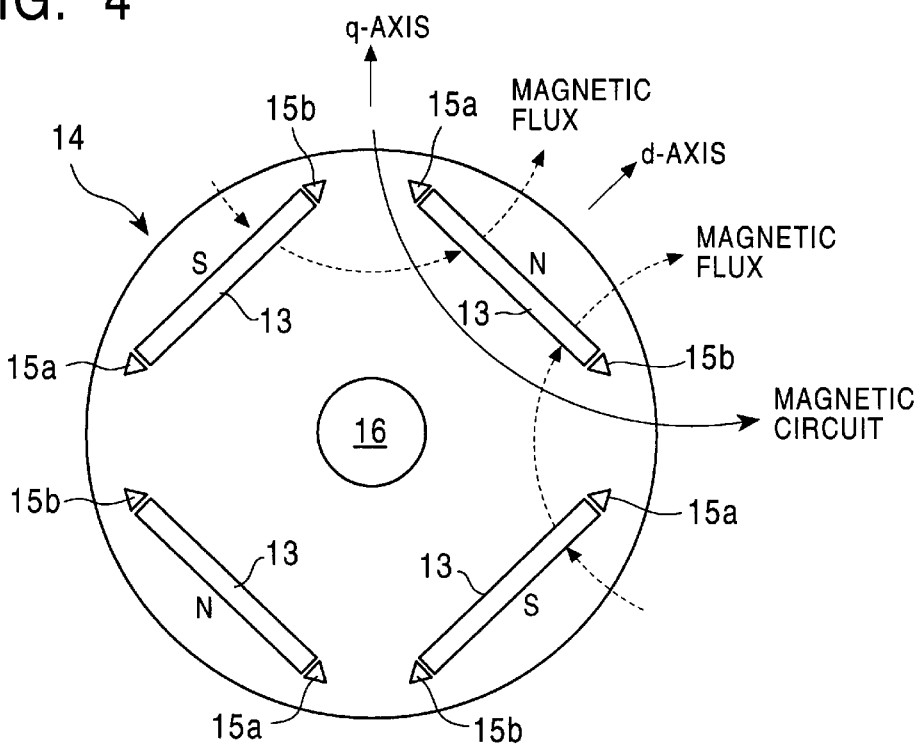
FIG. 4 is a plane view of a second core member constituting the rotor core in FIG. 3.

However, as shown in FIG. 4, the second permanent magnet 13 has a sectional rectangular shape, namely, a band plate shape having a predetermined thickness. Similar to the first permanent magnet 11, the second permanent magnets 13 are embedded in the second core member 14 in number according to the number of poles of the motor at regular spaced-intervals.

Since the second permanent magnet 13 has the band plate shape, an occupying percentage of magnet in the second core member 14 is smaller than that in the first core member 12.

Each second permanent magnet 13 is placed along a direction perpendicular to a diameter line of the second core member 14 in the vicinity of the outer circumference of the second core member 14.

Figure 1:
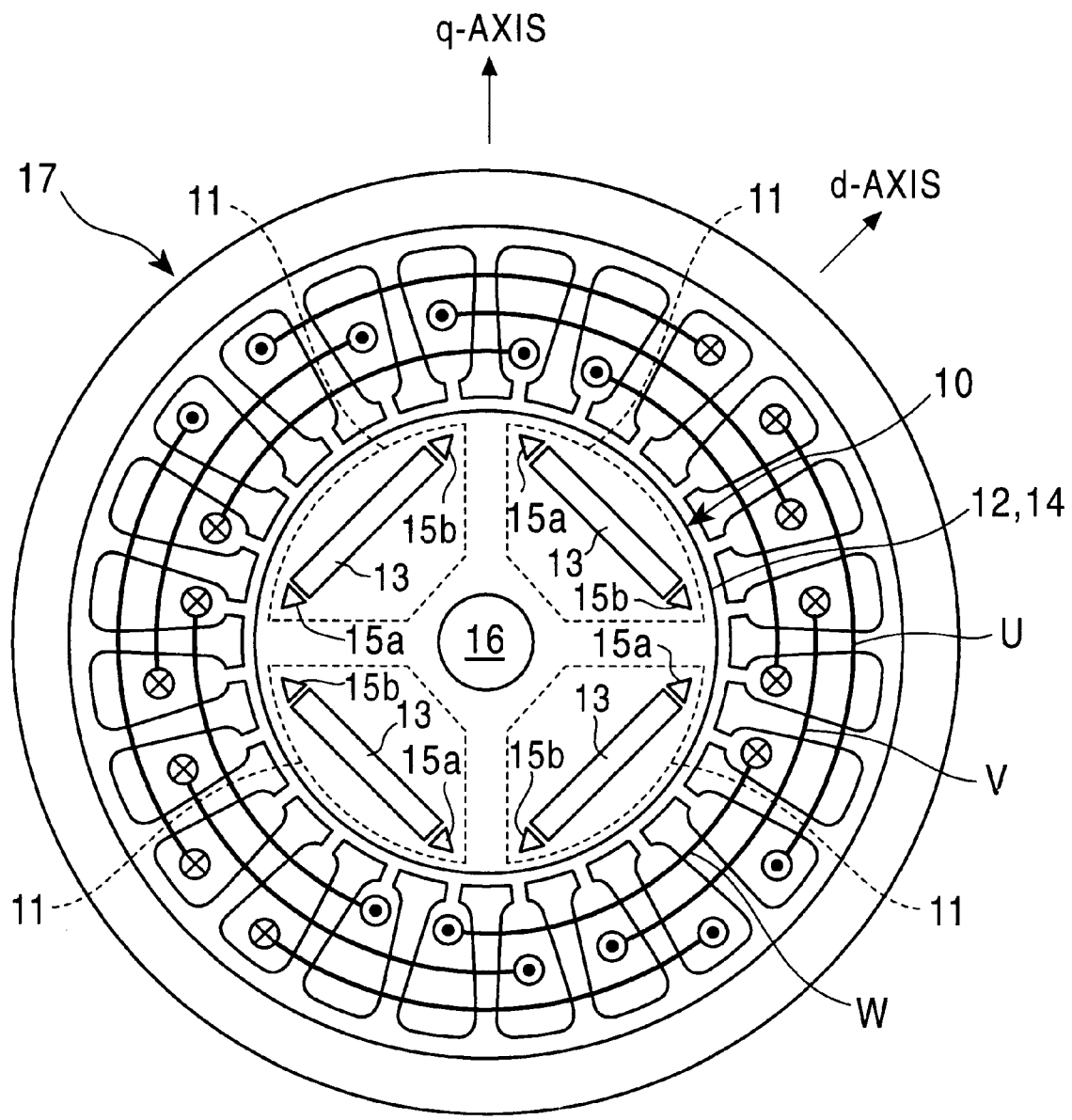
FIG. 1 is a diagrammatic plane view showing the first embodiment according to the present invention.

In joining the first core member 12 to the second core member 14 at the same axis, the first permanent magnets 11 and the second permanent magnets 13 are positioned to align the same magnetic poles with each other, in which relative to the first core member 12, the second permanent magnet 13 in the second core member 14 is disposed within a shadow area of the first permanent magnet 11 embedded in the first core member 12. As is clear from FIG. 1 showing the first permanent magnet 11 by a short dashed line and the second permanent magnet 13 by a solid line in the short dashed line, the second permanent magnet 13 is placed to be included in cross-section of the first permanent magnet 11.

A pair of flux-barrier holes 15a and 15b for avoiding the short-circuiting of magnetic flux and the leaking of magnetic flux is formed at each end of the second permanent magnet 13. Preferably, the flux-barrier holes 15a and 15b are also formed within the shadow area of the first permanent magnet 11.

Considering the rotor core 10, in the first core member 12, although the first permanent magnet 11 is made of a ferrite magnet which is inexpensive and has a low magnetic-flux density, since the configuration thereof is a sectional fan shape and the occupying percentage of magnet in the first core member 12 is high, the magnet torque can be increased to a certain degree. Nevertheless, since the q-axis inductance and the d-axis inductance have small values due to the high percentage of occupying magnet, the reluctance torque has a smaller value.

In the second core member 14, since the second permanent magnet 13 is made of a rare-earth magnet which is a high cost and has high magnetic-flux density, the magnet torque is large and the occupying percentage with respect to the second core member 14 is low. For reason of a small magnetic resistance of a magnetic circuit which is shown by a solid line with an arrow in FIG. 4, the magnetic flux from the stator core 17 easily enters the inside, so that a difference between the d-axis and q-axis inductances (Lq–Ld) increases, resulting in increase of the reluctance torque.

Consequently, in the rotor core 10, for example, where the ratio of the first core member 12 is relatively multiplied, the performance (torque, efficiency) is decreased, but also the cost is greatly reduced. In other words, use of the first permanent magnet 11 made of the ferrite magnet having a low cost is increased but use of the second permanent magnet 13 of the rare-earth magnet is decreased. Incidentally, the cost of the rare-earth magnet is 20 times that of the ferrite magnet.

Conversely, where the ratio of the second core member 14 is relatively multiplied, the performance is increased but the cost is also increased. Note that, depending upon use of the permanent magnet rotor type electric motor, the first core member 12 and the second core member 14 can both be increased or decreased.

Thus, by selecting the ratio of occupying of the first core member 12 and the second core member 14 in the rotor core 10, the motor having the required performance, size and cost can be obtained. That is to say the flexibility (the range of choice) in designing the motor is higher.

On the grounds of the first permanent magnet 11 having a cross-section shape larger than that of the second permanent magnet 13, on the connecting face of the first core member 12 and the second core member 14, the first permanent magnet 11 and the second permanent magnet 13 serve the function of flux barrier (a function for avoiding short-circuiting and leaking the magnetic flux) with respect to the permanent magnets being opposite each other. More specifically, a hole in which the first permanent magnet 11 is embedded functions as the flux barrier for the second permanent magnet 13, and a hole in which the second permanent magnet 13 is embedded functions as the flux barrier for the first permanent magnet 11.

In fabricating the rotor core 10, a mechanically core laminating method is used, in which a core material is stamped out from a magnetic steel plate by core press die with an automatic press machine, and the core materials are laminated in a predetermined number in the die and then riveted together.

In the press process, the core materials for the first core member 12 and the core materials for the second core member 14 may be separately stamped out in the predetermined number in advance, but in the present invention, the core materials all required for assembling the rotor core 10 are stamped out as the second core member 14 at the start. In this point, the holes for embedding the second permanent magnet 13 and the flux barrier holes 15a and 15b are formed in all of the core materials. After that, the number of core materials required for the first core member 12 is separated from all of the core materials, and the holes for embedding the first permanent magnet 11 are formed in the separated core materials. In this case, the embedding hole for the permanent magnet 11 is stamped out to replace the embedding magnet hole and the flux barrier holes 15a and 15b which are previously formed for the second core member 14, therefore only the embedding hole for the first permanent magnet 11 is formed in the core material for the first core member 12.

As described thus far, after the first core member 12 and the second core member 14 are unitedly assembled, the ferrite magnet as the first permanent magnet 11 is embedded in the first core member 12 and the rare-earth magnet as the second permanent magnet 13 is embedded in the second core member 14, and then the polarization is given, thereby obtaining the rotor core 10. Incidentally, the permanent magnets 11 and 13 can be embedded in the core after being polarized.

According to the present invention, using already-existing machine without new facilities, the rotor core 10 can be fabricated, resulting in no increment of production cost.

Moreover, by applying the rotor core 10 to Brushless DC motor as a motor for a compressor of an air conditioner, the performance of the air conditioner can be increased without the cost increment (the increase of operating efficiency and the decrease of vibration and noise).

Figure 5:
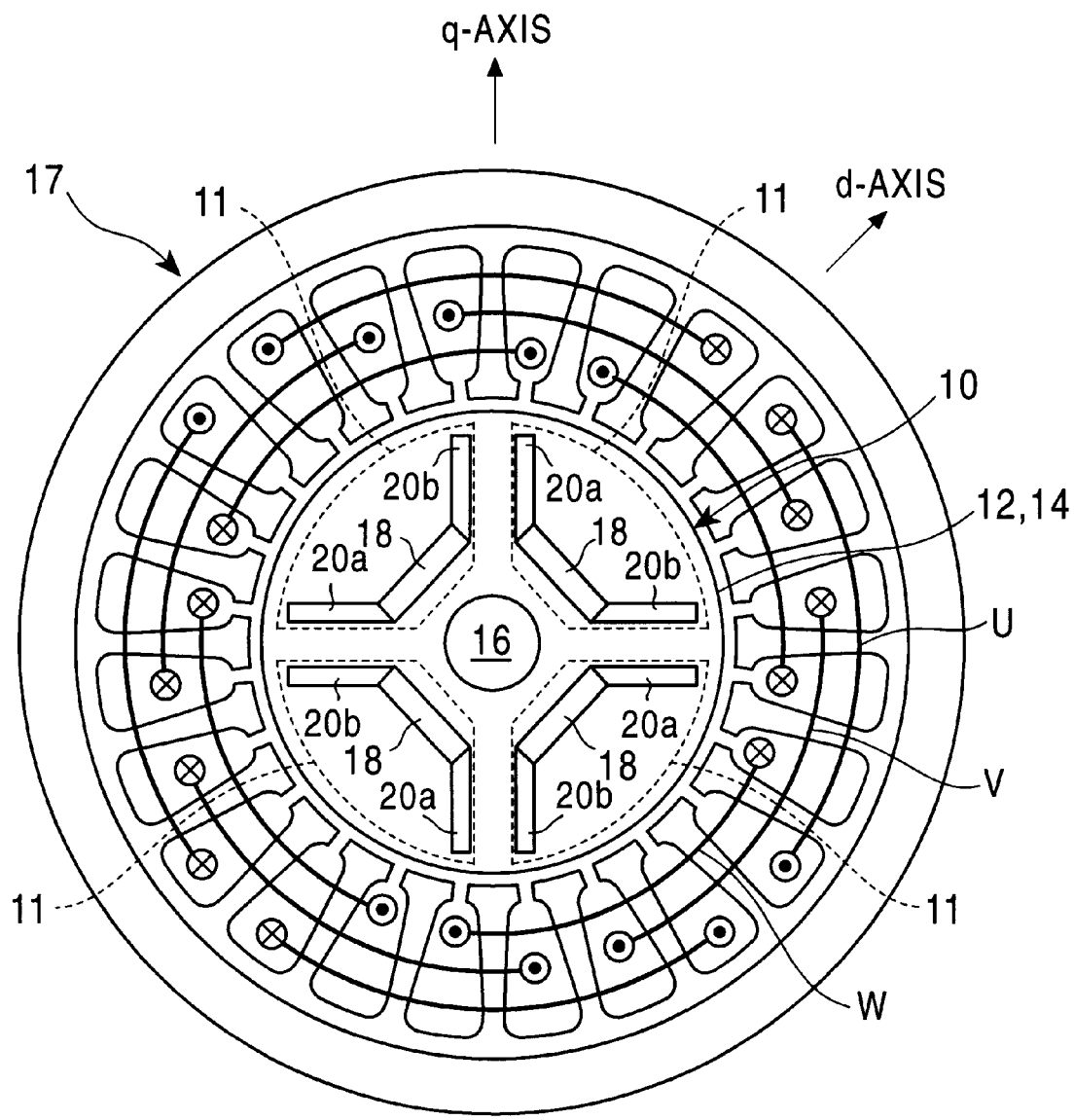
FIG. 5 is a diagrammatic plane view showing the second embodiment according to the present invention.
Figure 6:
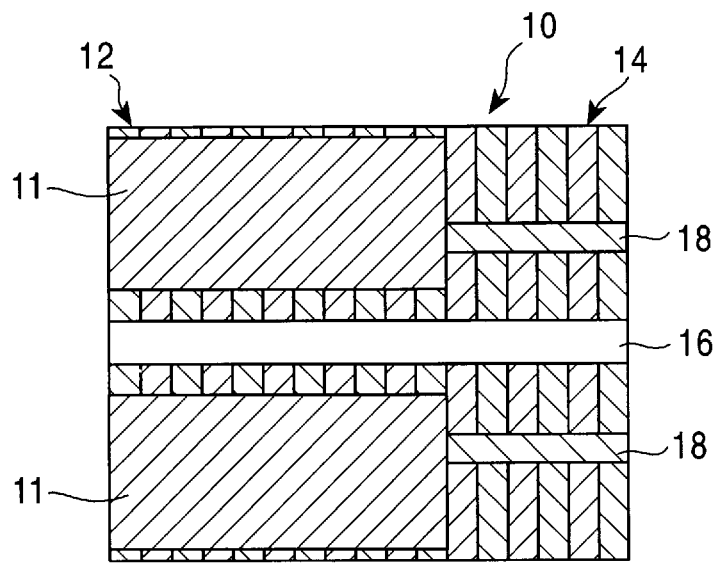
FIG. 6 is a sectional view taken along the d-axis of a rotor core applied in the second embodiment of FIG. 5.
Figure 7:
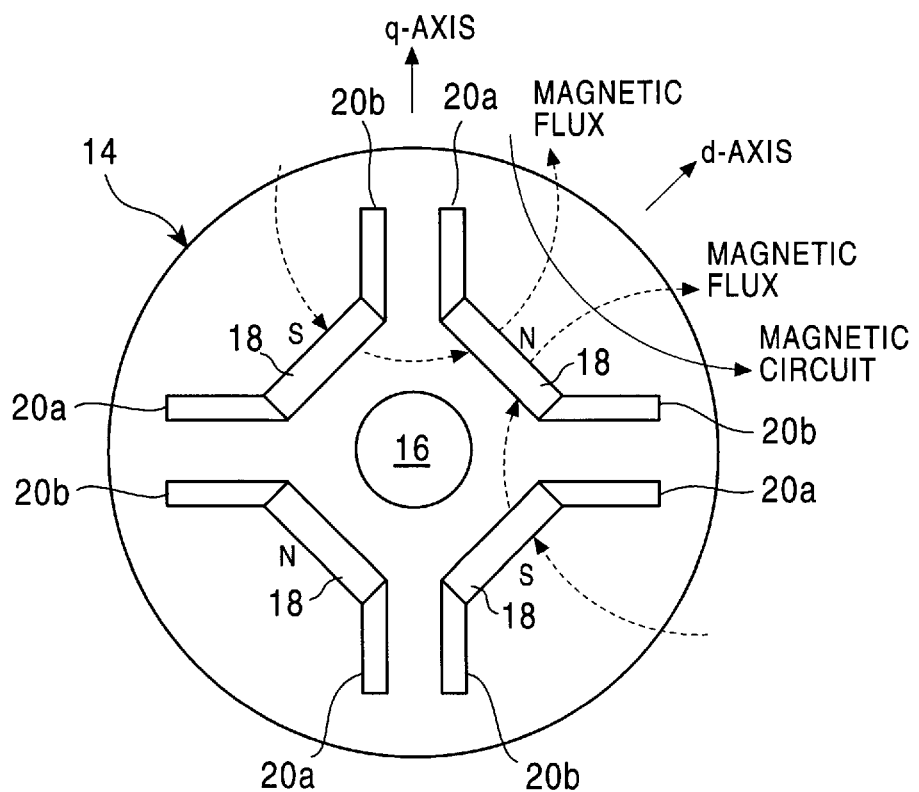
FIG. 7 is a plane view of a second core member constituting the rotor core.

The second embodiment shown in FIG. 5 to FIG. 7 will be explained below. In the second embodiment, a second permanent magnet 18 embedded in the second core member 14 is changed from that of the first embodiment, but other structures are the same as these of the first embodiment.

The second permanent magnet 18 embedded in the second core member 14 is also made of the rare-earth magnet of rectangular cross-section in the second embodiment. The second permanent magnet 18, however, is placed along a direction approxinmately orthogonal to a diameter line of the second core member 14 on the inner circumference side of the second core member 14.

The second permanent magnet 18 has a smaller wide than that of the second permanent magnet 13 in the first embodiment so as to enter the shadow area of the cross-sectional fan shape of the first permanent magnet 11 which is embedded in the first core member 12. According to the second embodiment, slit-shaped flux-barrier holes 20a and 20b extending toward the core outer circumference along an interface between the magnetic poles, are formed at both ends of the second permanent magnet 18. Preferably, the flux barrier holes 20a and 20b are extended as close to the outer circumference of the core as possible. However, the length of the flux barrier hole is determined so that the flux barrier holes 20a and 20b do not extend off the shadow area of the cross-sectional fan shape of the first permanent magnet 11 embedded in the first core member 12.

As compared with the first embodiment, the positions and the amount of second permanent magnet 18 are changed, thereby obtaining rotor cores having various values of the magnetic-flux density (magnet torque) and the magnetic resistance of a magnetic circuit (reluctance torque) and various costs.

Figure 8:
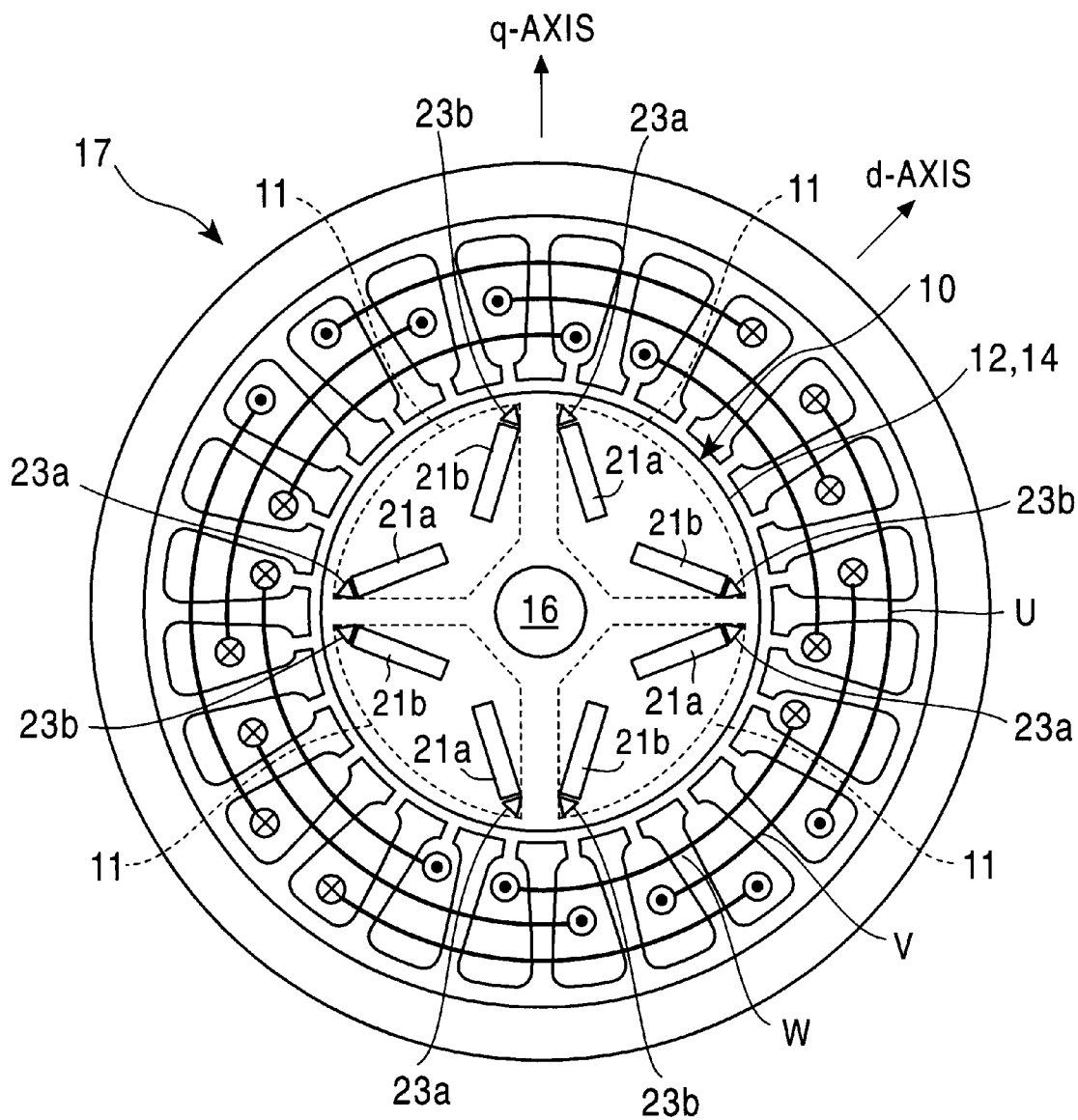
FIG. 8 is a diagrammatic plane view showing the third embodiment according to the present invention.
Figure 9:
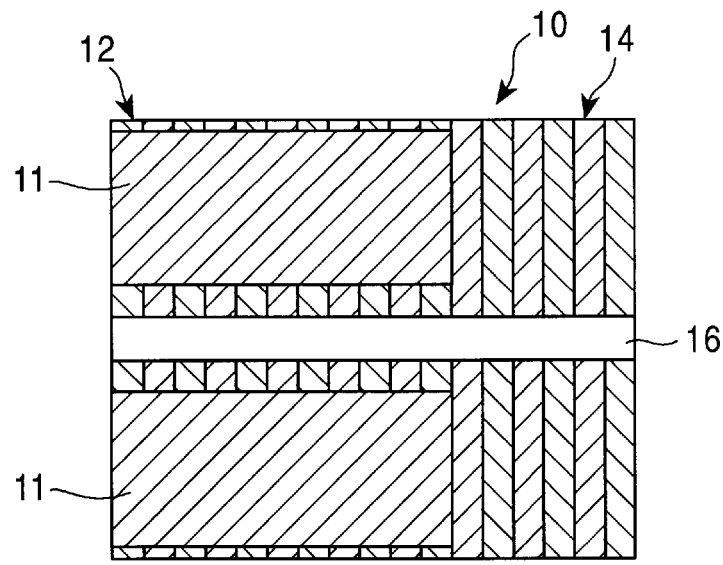
FIG. 9 is a sectional view taken along the d-axis of a rotor core applied in the third embodiment of FIG. 8.
Figure 10:
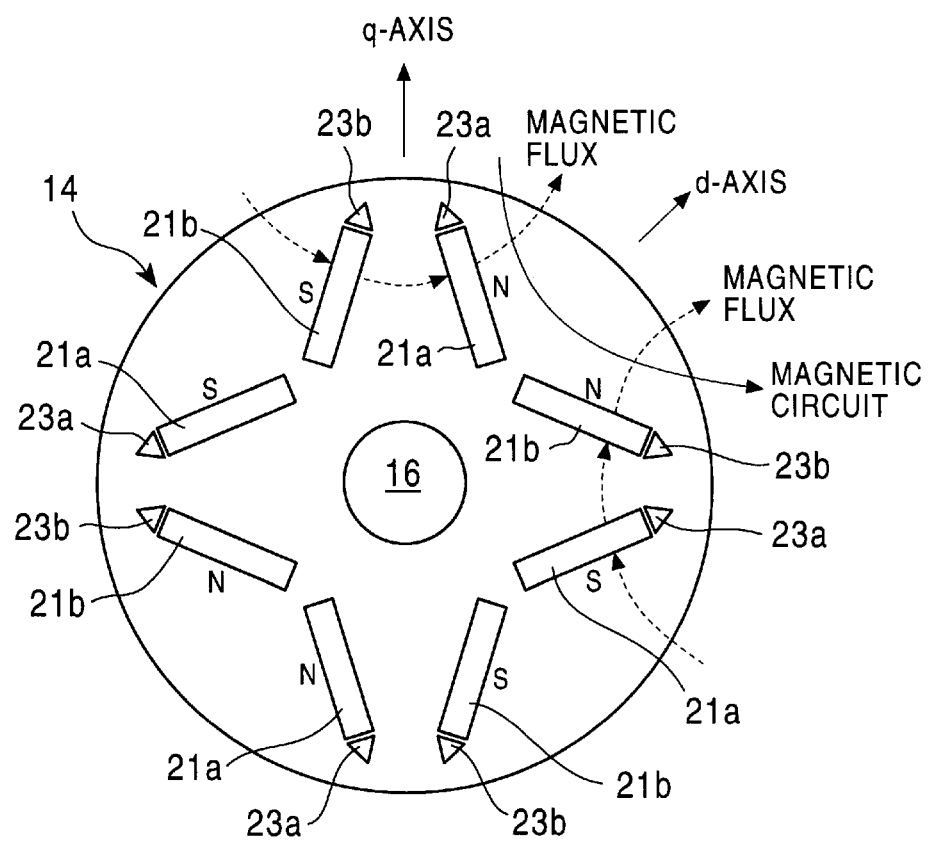
FIG. 10 is a plane view of a second core member constituting the rotor core.

In the third embodiment shown in FIG. 8 to FIG. 10, two magnet pieces 21a and 21b as the second permanent magnet are embedded per magnetic pole in the second core member 14. Other structures such as the stator core 17 and the first core member 12 in the third embodiment are the same as these in the first embodiment.

The magnet pieces 21a and 21b are made of the rare-earth magnet of rectangular cross-section, and arranged at an angle to decrease in space toward the ends oriented toward the center of the rotor core 10, in other words, they are arranged to be line-symmetric with respect to the d-axis so that the crossing angle thereof makes an obtuse angle.

Flux barrier holes 23a and 23b are respectively formed on the other end sides of the magnet pieces 21a and 21b located closer to the core outer circumference. The flux barrier holes 23a and 23b can be formed to be respectively combined with the embedding holes for the magnet pieces 21a and 21b.

In this point, similar to the first and second embodiments, the magnet pieces 21a and 21b and the flux barrier holes 23a and 23b are located within the shadow area of the cross-sectional fan shape of the first permanent magnet 11 embedded in the first core member 12.

In the third embodiment, by using two magnet pieces 21a and 21b as the second permanent magnet, the amount of used rare-earth magnet is higher, so that the large magnet torque can be obtained. As shown in FIG. 10, since the magnet pieces 21a and 21b are placed along the magnetic circuit, the magnetic resistance of the magnetic circuit can be minimized, and thereby the reluctance torque can be increased in maximum. As a result, a motor having a higher torque and higher efficiency than those in the first and second embodiments can be achieved.

Figure 11:
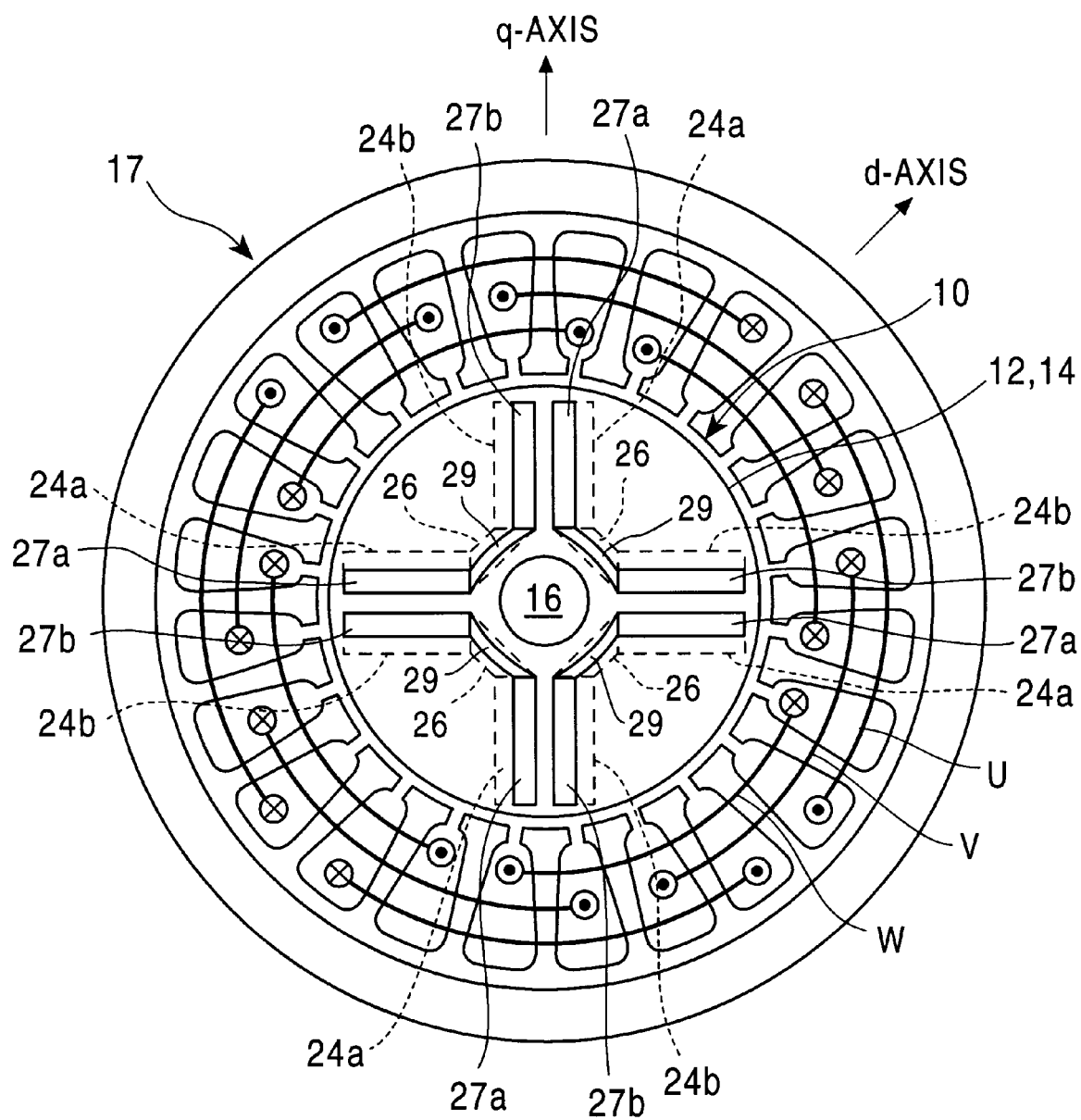
FIG. 11 is a diagrammatic plane view showing the fourth embodiment according to the present invention.

The fourth embodiment will be described hereinafter in reference with FIG. 11 to FIG. 13. In the fourth embodiment, the first permanent magnet of the first core member 12 and the second permanent magnet of the second core member 14 are changed. In FIG. 11 showing the entire structure of the fourth embodiment, the stator core 17 is the same as that of other embodiments.

Figure 12:
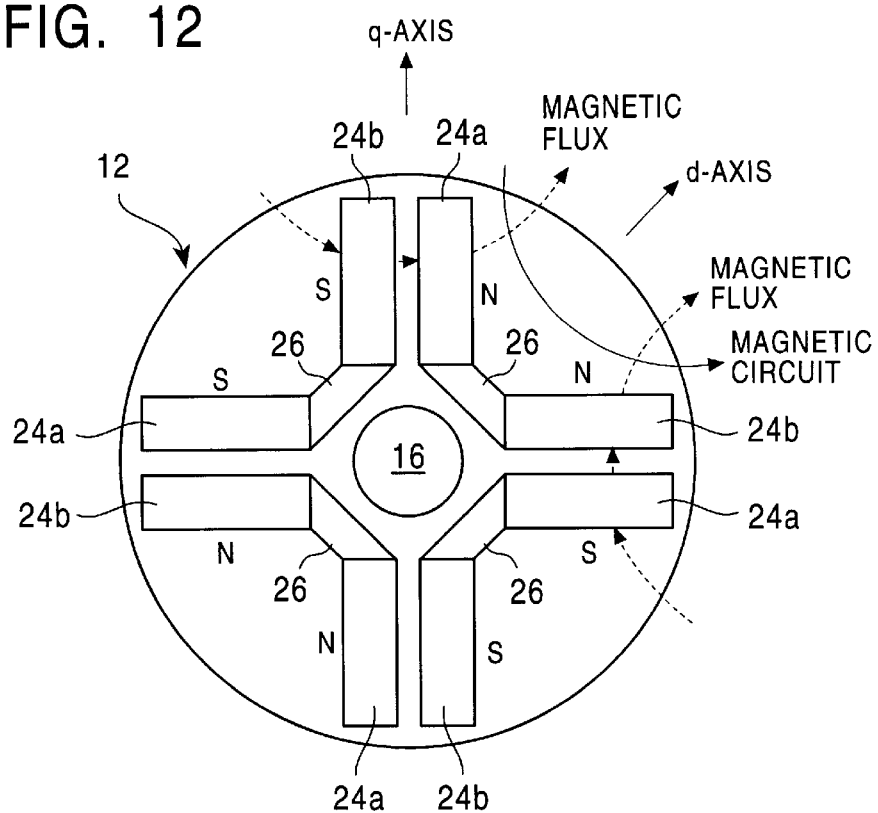
FIG. 12 is a plane view of a first core member constituting a rotor core applied in the fourth embodiment.

As is clear from FIG. 12, two first magnet pieces 24a and 24b are used for a magnetic pole as the first permanent magnet embedded in the first core member 12. The first magnet pieces 24a and 24b are each made of the ferrite magnet having a band plate shape having rectangular cross-section and a specific thickness. The first magnet pieces 24a and 24b are arranged along an interface between the magnetic poles. A first flux-barrier hole 26 is formed between ends of the first magnet pieces 24a and 24b on the inner circumference side of the core. It is desirable that the first flux-barrier hole 26 is formed as close to the inner circumference of the core as possible.

Figure 13:
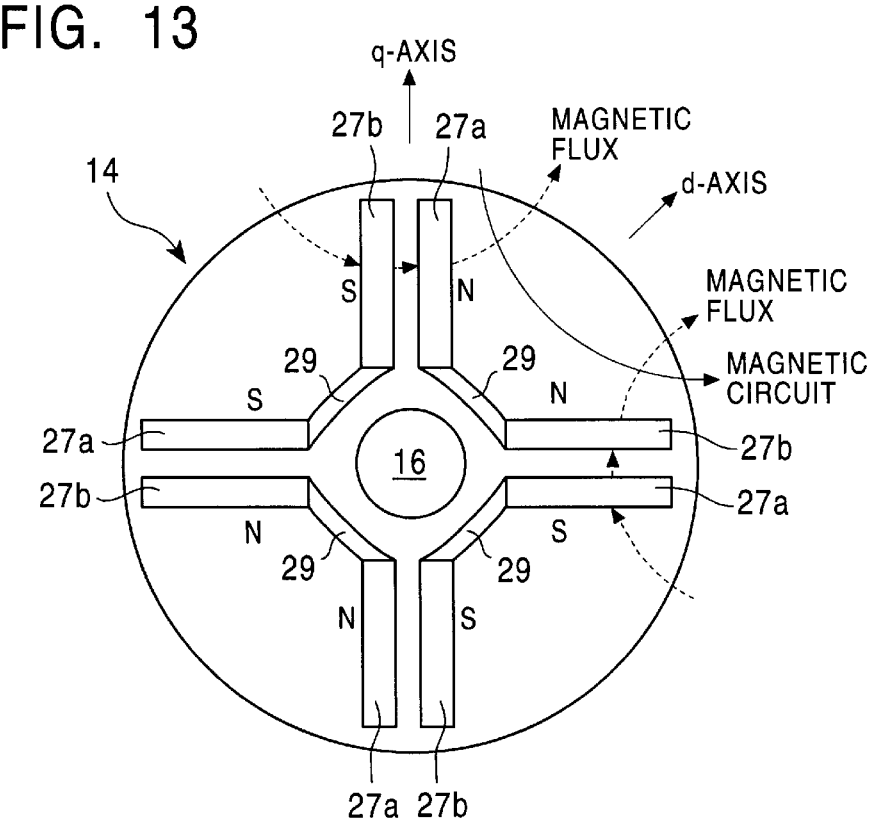
FIG. 13 is a plane view of a second core member constituting the rotor core.

As shown in FIG. 13, two second magnet pieces 27a and 27b are also used for a magnetic pole as the second permanent magnet embedded in the second core member 14. The second magnet pieces 27a and 27b are each made of the rare-earth magnet having a band plate shape having rectangular cross-section and a specific thickness. Similar to the first magnet pieces 24a and 24b, the second magnet pieces 27a and 27b are arranged along an interface between the magnetic poles, additionally, a second flux-barrier hole 29 is formed between ends of the second magnet pieces 27a and 27b on the inner circumference side of the core.

In this point, the thickness of each second magnet pieces 27a and 27b is thinner than that of each first magnet pieces 24a and 24b. And also, the second flux-barrier hole 29 has substantially shorter length and width than those of the first flux-barrier hole 26.

In other words, the second magnet pieces 27a and 27h and the second flux-barrier hole 29 are respectively placed to include in the shadow areas of the first magnet pieces 24a and 24b and the first flux-barrier hole 26.

Figure 14:
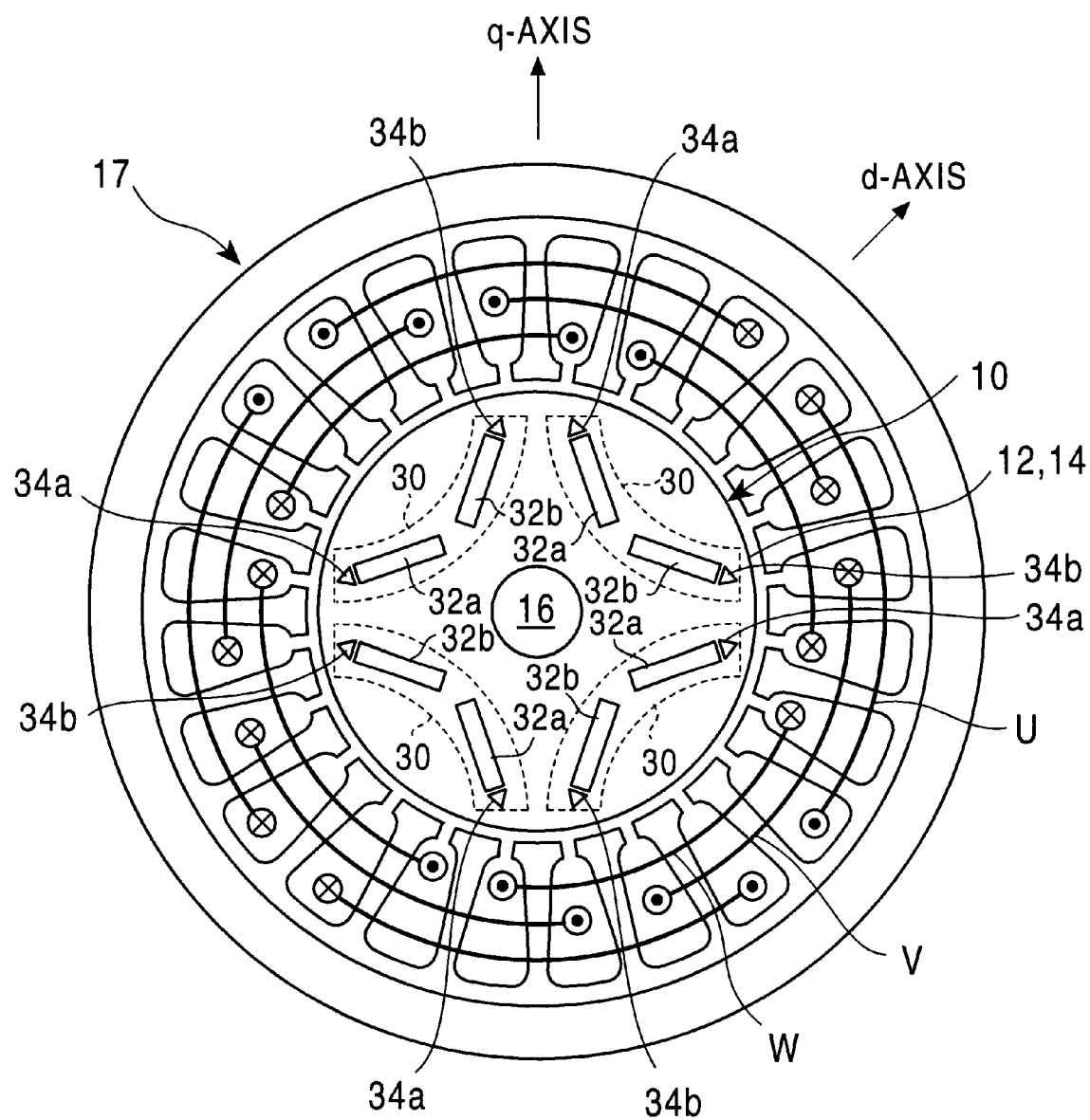
FIG. 14 is a diagrammatic plane view showing the fifth embodiment according to the present invention.
Figure 15:
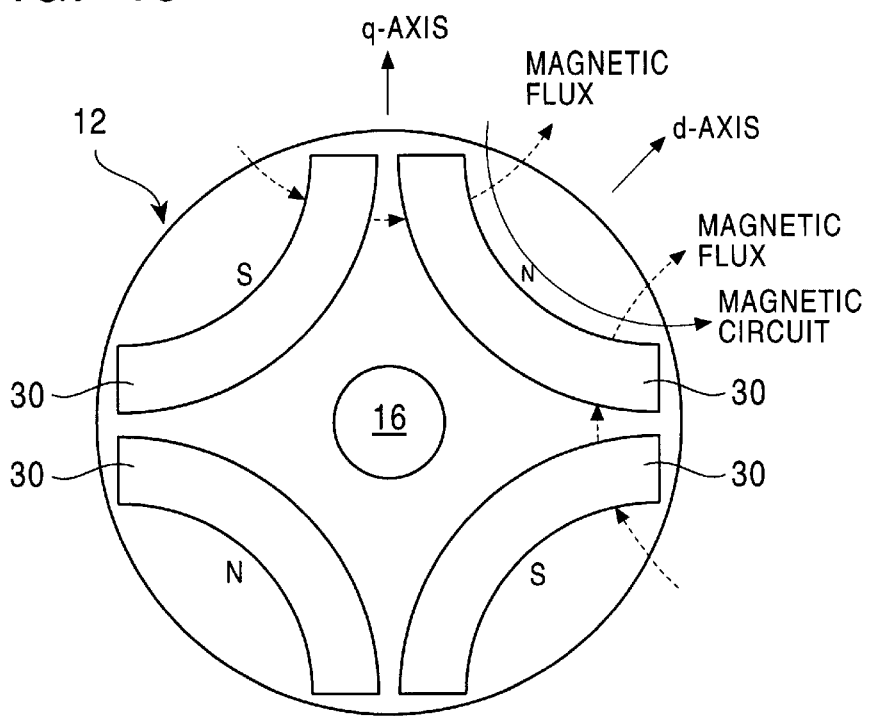
FIG. 15 is a plane view of a first core member constituting a rotor core applied in the fifth embodiment.

The fifth embodiment will be explained below with reference to FIG. 14 to FIG. 16. Incidentally, in FIG. 14 showing the entire structure of the fifth embodiment, the stator core 17 is the same as that of the aforementioned embodiments.

In the fifth embodiment, a first permanent magnet 30 embedded in the first core member 12 is made of the ferrite magnet and formed in a sectional arc shape. As shown in FIG. 15, a first permanent magnet 30 is assigned per a magnetic pole, and placed to orient its convexity toward the center of the core.

Figure 16:
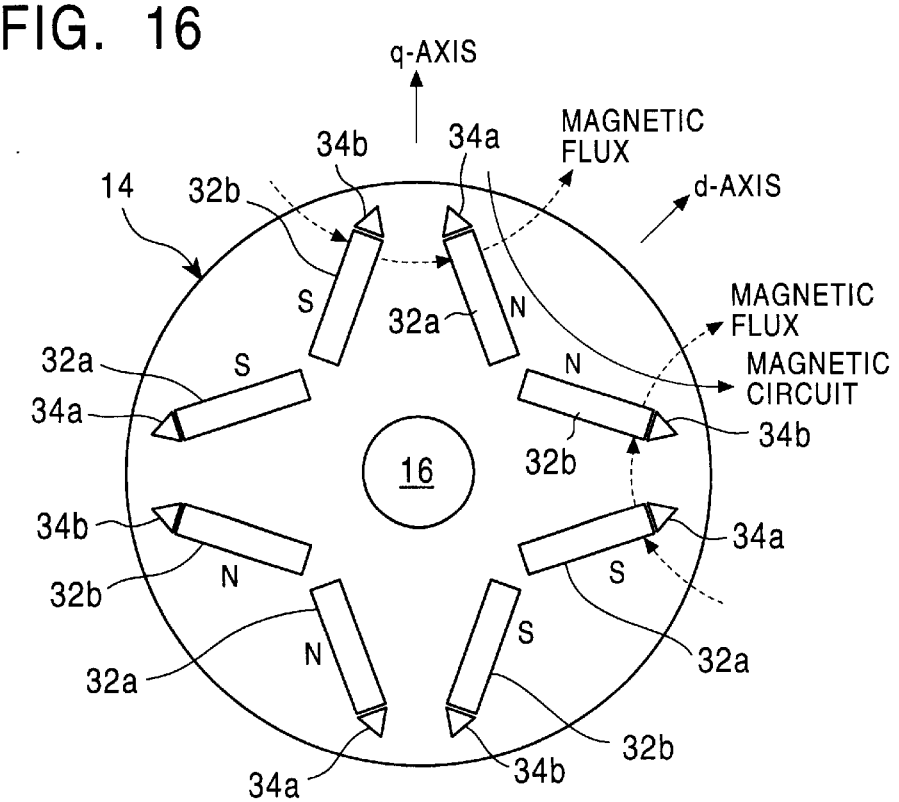
FIG. 16 is a plane view of a second core member constituting the rotor core.

In the second core member 14, similar to the third embodiment, two magnet pieces 32a and 32b are used as the second permanent magnet for a magnetic pole as shown in FIG. 16.

The magnet pieces 32a and 32b are each made of the rare-earth magnet of rectangular cross-section, and are arranged at an angle to decrease in space toward the ends thereof oriented toward the center of the rotor core 10, in other words, the magnet pieces 32a and 32b are arranged to be line-symmetric with respect to the d-axis so that the crossing angle thereof makes an obtuse angle.

Flux barrier holes 34a and 34b are respectively formed on the other end sides of the magnet pieces 32a and 32b located closer to the core outer circumference.

The magnet pieces 32a and 32b and the flux barrier holes 34a and 34b are located within the shadow area of the cross-sectional arc shape of the first permanent magnet 30 embedded in the first core member 12.

The typical embodiments according to the present invention have described hereinbefore, but the following various modifications are also included in the scope of the present invention. Note that in the modifications, the stator core 17 does not need to be changed, so that each drawing for the modifications shows only a diagrammatic plane view of the rotor core 10.

Each plane view of the rotor core relating to each modification is a drawing when the rotor core is shown from the second core member 14 side, so that the second permanent magnet in the second core member 14 is represented by a solid line and a short dashed line shows the first permanent magnet in the first core member 12 which is located in a position under paper with respect to the second core member 14.

Figure 17:
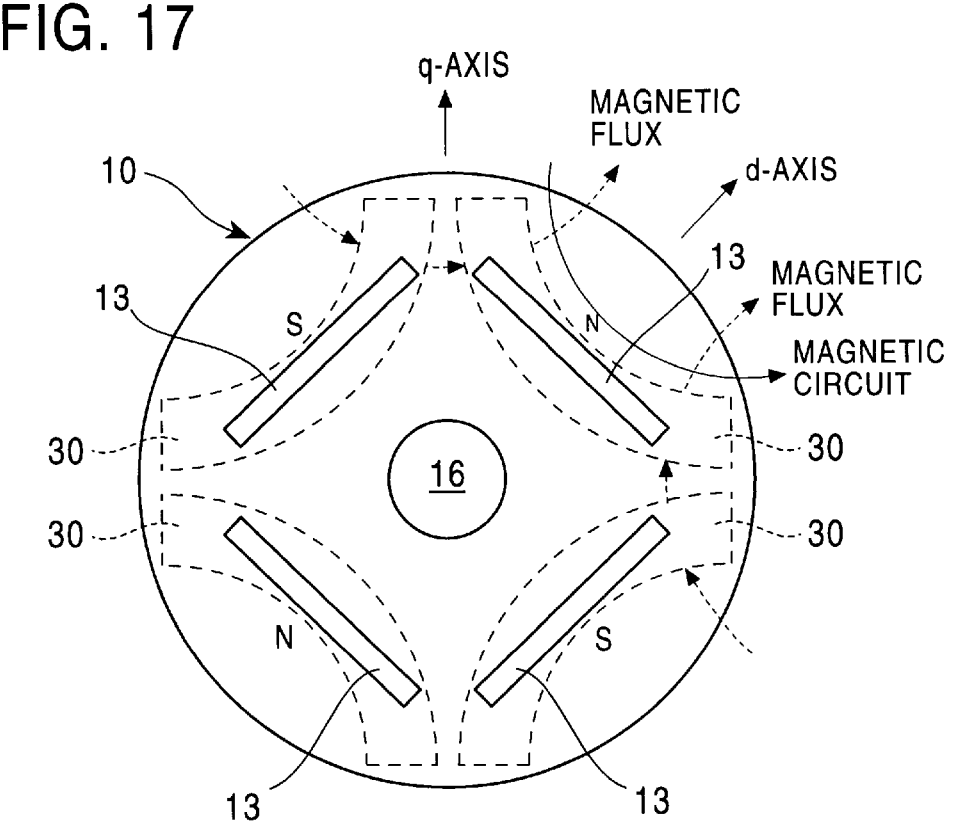
FIG. 17 to FIG. 22 respectively are plane views showing modifications of a rotor core.

In the first modification shown in FIG. 17, the rotor core 10 is constructed by coaxially and unitedly joining the first core member 12 described in the fifth embodiment to the second core member 14 described in the first embodiment.

More specifically, in the first core member 12, the first permanent magnet 30 made of the ferrite magnet of arc-shaped cross-section is placed per magnetic pole to orient its convexity toward the center of the core. In the second core member 14, the second permanent magnet 13, made of the rare-earth magnet of rectangular cross-section (a flat band plate shape), per magnetic pole is disposed along a direction perpendicular to a diameter line of the second core member 14 on the outer circumference side of the second core member 14. Note that the flux barrier holes (not shown) are respectively formed at the ends of the second permanent magnet 13.

Figure 18:
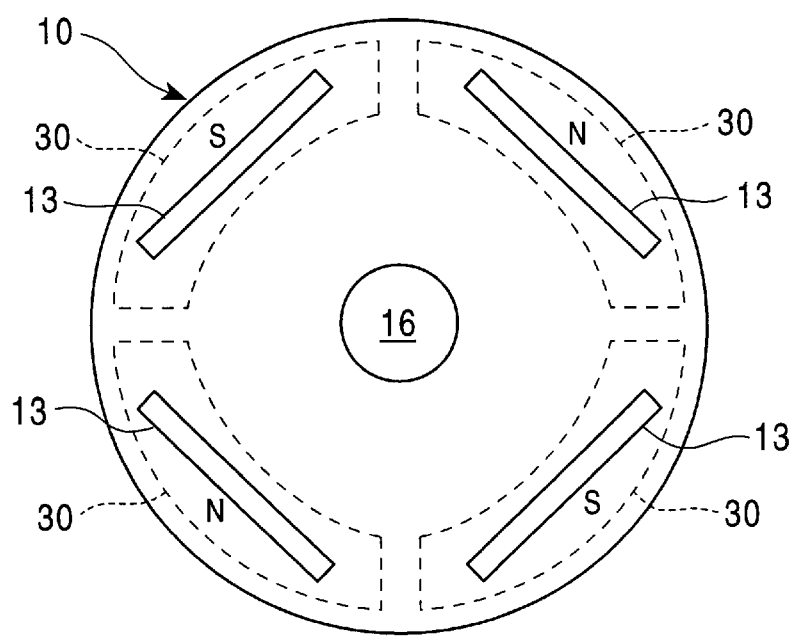

As shown in FIG. 18 as the second modification, the first permanent magnet 30 made of the ferrite magnet of arc-shaped cross-section in the first modification can be placed to orient its convexity along the outer circumference of the core.

Figure 19:
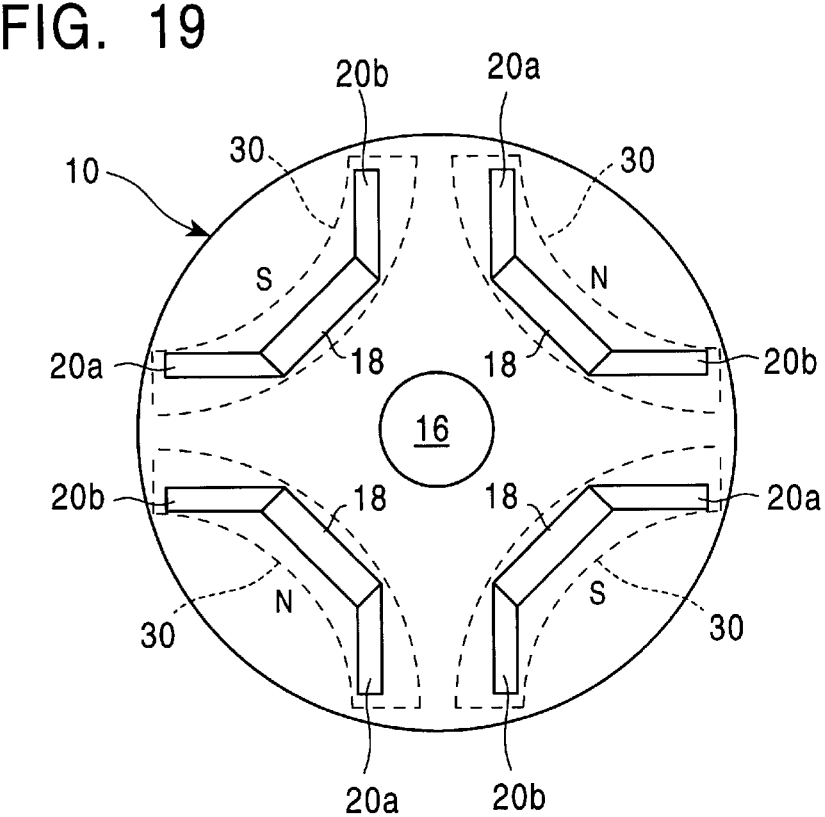

FIG. 19 shows the rotor core 10 as the third modification, which is constructed by coaxially and unitedly joining the first core member 12 explained in the fifth embodiment and the second core member 14 explained in the second embodiment.

The first core member 12 is the same as that of the first modification, so that the explanation will be omitted. In the second core member 14, the second permanent magnet 18, made of the rare-earth magnet of rectangular cross-section, per magnetic pole is placed along a direction perpendicular to a diameter line of the second core member 14 on the inner circumference side of the second core member 14. The slit-shaped flux-barrier holes 20a and 20b extending toward the core outer circumference along an interface between the magnetic poles are formed at the ends of the second permanent magnet 18.

Figure 20:
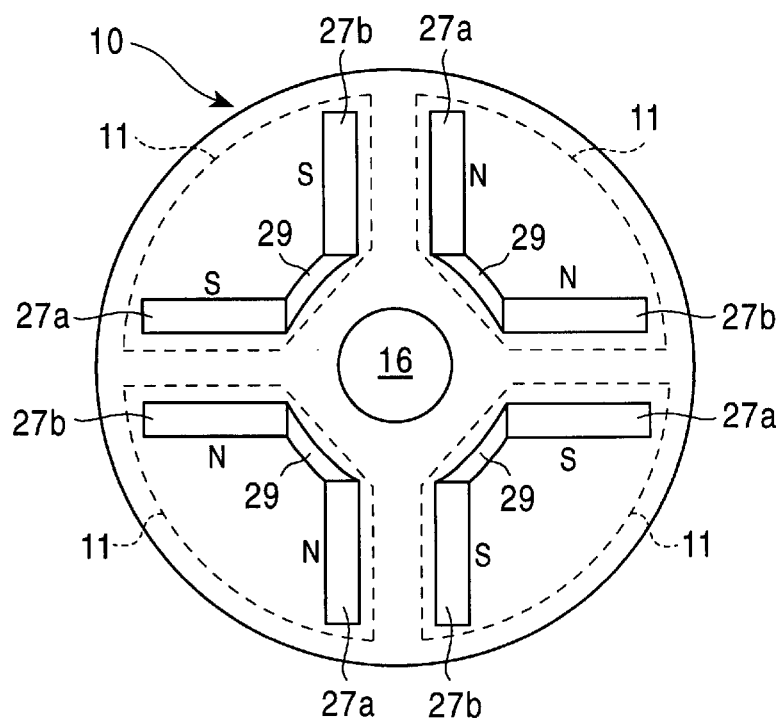

FIG. 20 shows the rotor core 10 as the fourth modification, which is constructed by coaxially and unitedly joining the first core member 12 described in the first embodiment and the second core member 14 described in the fourth embodiment.

Specifically, in the first core member 12, the first permanent magnet 11 made of the ferrite magnet of fan-shaped cross-section is provided per magnetic pole. In the second core member 14, the two second magnet pieces 27a and 27b per magnetic pole are used. The second magnet pieces 27a and 27b are each made of the rare-earth magnet of a band plate shape having a sectional rectangular shape and a predetermined thickness, and disposed along an interface between the magnetic poles. The second flux barrier hole 29 is formed between the ends of the magnetic pieces 27a and 27b on the inner circumference side of the core.

Figure 21:
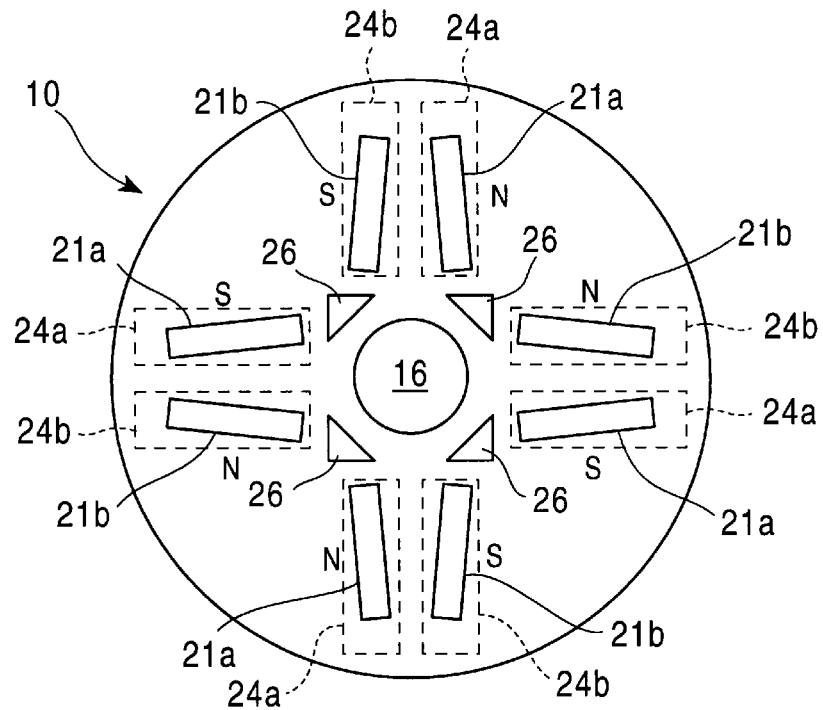

FIG. 21 shows the fifth modification, in which the rotor core 10 is constructed by coaxially and unitedly joining the first core member 12 described in the fourth embodiment and the second core member 14 described in the third embodiment.

Specifically, in the first core member 12, the two magnet pieces 24a and 24b per magnetic pole are used as the first permanent magnet. The magnet pieces 24a and 24b are each made of the ferrite magnet of a band plate shape having rectangular cross-section and a predetermined thickness, and placed along an interface between the magnetic poles. The flux barrier hole 26 is between the ends of the magnet pieces 24a and 24b on the inner circumference side of the core. In the second core member 14, the two magnet pieces 21a and 21b per magnetic pole are used as the second permanent magnet. The magnet pieces 21a and 21b are each made of the rare-earth magnet of rectangular cross-section, and arranged at an angle to decrease in space toward the ends of the magnet pieces 21a and 21b which are oriented toward the center of the rotor core 10. The flux barrier hole (not shown) is formed each end of the magnet pieces 21a and 21b in the vicinity of the outer circumferential of the core.

Figure 22:
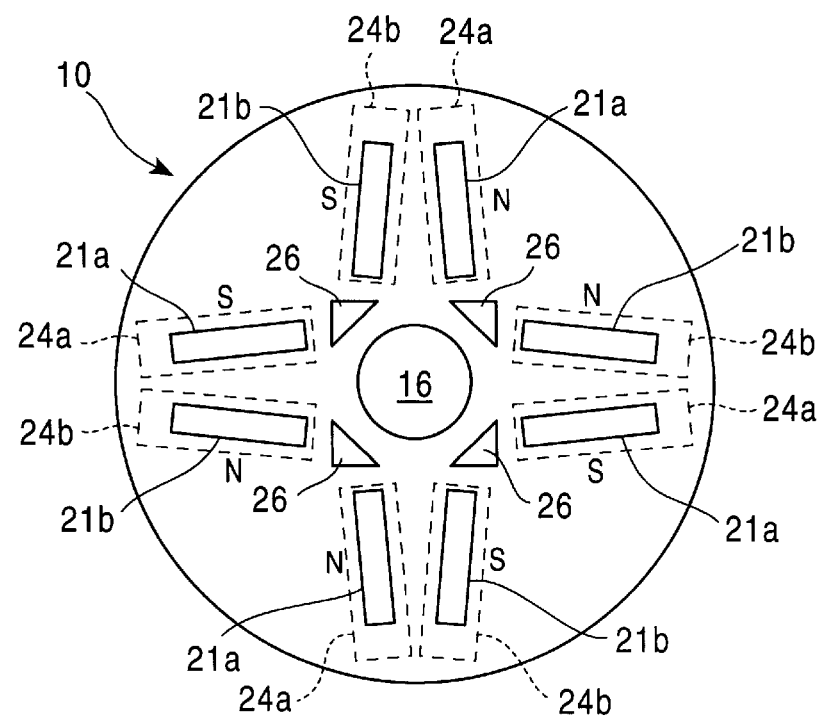
Figure 23:
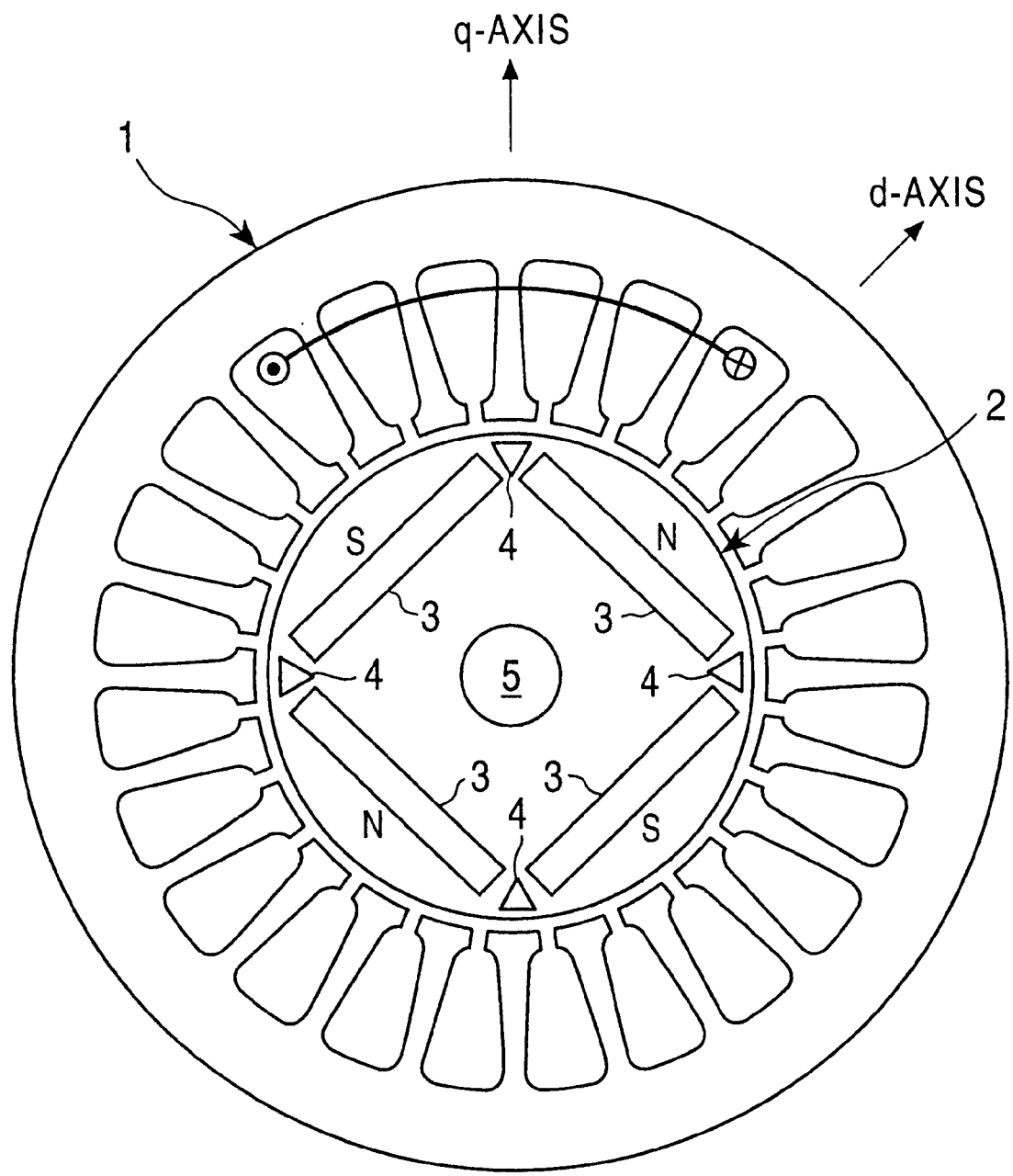
FIG. 23 and FIG. 24 respectively are diagrammatic plane views showing conventional examples.
Figure 24:
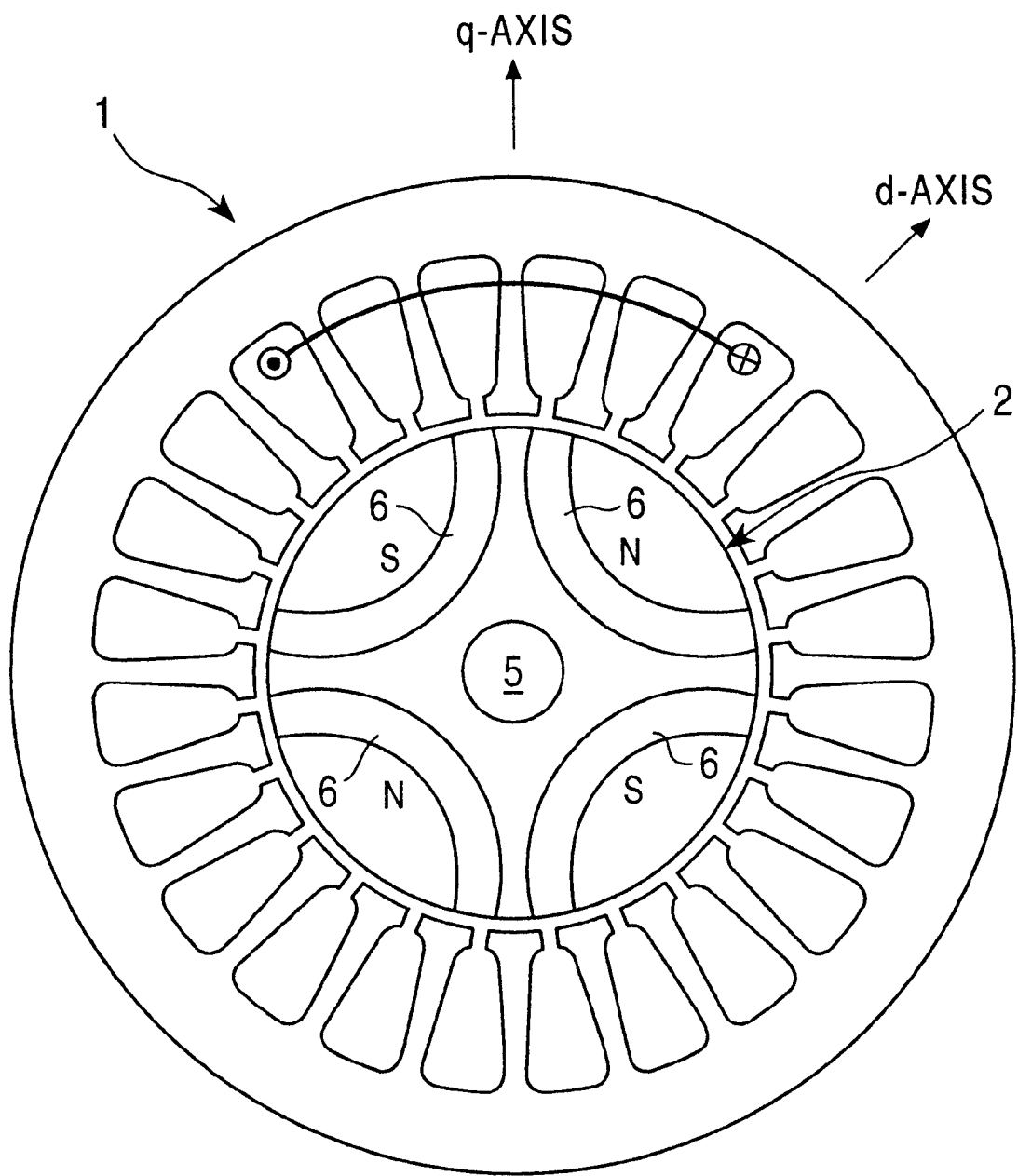

FIG. 22 shows the sixth modification, in which the two magnet pieces 24a and 24b used as the first permanent magnet in the fifth modification are further modified. Specifically, as compared with the fifth modification in which the two magnet pieces 24a and 24b are arranged parallel to each other along an interface between the magnetic poles in the first core member 12, the two magnet pieces 24a and 24b in the first core member 12 can be arranged, similar to the two magnet pieces 21a and 21b in the second core member 14, to have an angle to decrease in space toward the ends of the magnet pieces 24a and 24b which are oriented toward the center of the rotor core 10.

It should be mentioned that, as is clear from each drawing for the modifications, in either case, the length and width of the second permanent magnet in the second core member 14 are substantially shorter than those of the first permanent magnet in the first core member 12 so that the second permanent magnet is included in the shadow area of the first permanent magnet.

Although the present invention has been shown and described with respect to best mode embodiments and modifications thereof, those skilled in the art understanding the subject-matter of the present invention should readily think out other changes, variations, and equivalents thereof, so that the scope of the present invention should be within the scope of the accompanying claims and the equivalencies thereof.

What is claimed is:

1. A permanent magnet rotor type electric motor, having a stator core generating a rotation magnetic field and provided therein with a rotor core in which each magnetic pole is formed by a permanent magnet, wherein the rotor core comprises a first core member and a second core member which are unitedly joined together at the same axis with respect to the rotation axis of the rotor core, a first permanent magnet of a predetermined cross-section shape being embedded per magnetic pole in the first core member, and a second permanent magnet which is made of a different material and has a different cross-section shape from those of the first permanent magnet being embedded per magnetic pole in the second core member.

2. The permanent magnet rotor type electric motor according to claim 1, wherein said first permanent magnet in said first core member is made of a ferrite magnet; and wherein said second permanent magnet in said second core member is made of a rare-earth magnet.

3. The permanent magnet rotor type electric motor according to claim 1, wherein said first and second core members is made up by a laminated body of a magnetic steel plate having a hole for embedding of the permanent magnet and the flux barrier hole which are stamped out by pressing, the hole for embedding of the permanent magnet and the flux barrier hole of said first core member being stamped out to replace the hole for embedding the permanent magnet and the flux barrier hole of said second core member.

4. A brushless DC motor comprising the rotor core according to claim 1.

5. A permanent magnet rotor type electric motor, having a stator core generating a rotation magnetic field and provided therein with a rotor core in which each magnetic pole is formed by a permanent magnet, wherein the rotor core comprises a first core member and a second core member which are unitedly joined together at the same axis with respect to the rotation axis of the rotor core, a first permanent magnet of a predetermined cross-section shape being embedded per magnetic pole in the first core member, and a second permanent magnet which is made of a different material and has a different cross-section shape from those of the first permanent magnet being embedded per magnetic pole in the second core member, and the second permanent magnet is disposed within a shadow area of a cross-section shape of the first permanent magnet in the second core member.

6. The permanent magnet rotor type electric motor according to claim 5, wherein said first permanent magnet has a sectional fan shape; and wherein said second permanent magnet has a sectional rectangular shape, and is placed along a direction perpendicular to a diameter line of said rotor core on the outer circumference side of said rotor core, and a pair of flux barrier holes is formed at the ends of said second permanent magnet, said second permanent magnet and the flux barrier holes being arranged within the shadow area of the sectional fan shape of said first permanent magnet in said second core member.

7. The permanent magnet rotor type electric motor according to claim 5, wherein said first permanent magnet has a sectional fan shape; and wherein said second permanent magnet has a sectional rectangular shape, and is placed along a direction perpendicular to a diameter line of said rotor core on the inner circumference side of said rotor core, and a pair of flux barrier holes, extending in a slit shape toward the outer circumference of said rotor core along a diameter line of said rotor core, is formed at the ends of said second permanent magnet, said second permanent magnet and the flux barrier holes being arranged within the shadow area of the sectional fan shape of said first permanent magnet in said second core member.

8. The permanent magnet rotor type electric motor according to claim 5, wherein said first permanent magnet has a sectional fan shape; and wherein said second permanent magnet has two second magnet pieces of rectangular cross-section which are arranged at an angle to decrease in space toward ends of the two second magnet pieces which are oriented toward the center of said rotor core, and flux barrier holes are respectively formed at the other ends of the second magnet pieces, the two second magnet pieces of said second permanent magnet and the flux barrier holes being arranged within the shadow area of the sectional fan shape of said first permanent magnet in said second core member.

9. The permanent magnet rotor type electric motor according to claim 5, wherein said first permanent magnet has two first magnet pieces of rectangular cross-section each of which is placed along an interface between the magnetic poles, and a first flux barrier hole is formed between ends of the two first magnet pieces on the inner circumference side of said core; and wherein said second permanent magnet has two second magnet pieces of rectangular cross-section each of which is placed along an interface between the magnetic poles, and a second flux barrier hole is formed between the ends of the two second magnet pieces on the inner circumference side of said core, the two second magnet pieces of said second permanent magnet and the second flux barrier hole being arranged within each shadow area of the two first magnet pieces of said first permanent magnet and the first flux barrier hole in said second core member.

10. The permanent magnet rotor type electric motor according to claim 5, wherein said first permanent magnet has a sectional arc shape and is placed to orient the convexity thereof toward the center of said rotor core; and wherein said second permanent magnet has two second magnet pieces of rectangular cross-section which are arranged at an angle to decrease in space toward ends of the two second magnet pieces which are oriented toward the center of said rotor core, and a flux barrier hole is formed at the other end of each second magnet piece, the two second magnet pieces of said second permanent magnet and the flux barrier holes being arranged within the shadow area of the sectional arc shape of said first permanent magnet in said second core member.

11. The permanent magnet rotor type electric motor according to claim 5, wherein said first permanent magnet has a sectional arc shape and is placed to orient the convexity thereof toward the center of said rotor core; and wherein said second permanent magnet is placed in a sectional rectangular shape along a direction perpendicular to a diameter line of said rotor core on the outer circumference side of said rotor core, and a pair of flux barrier holes is formed at the ends of said second permanent magnet, said second permanent magnet and the flux barrier holes being arranged within the shadow area of the sectional art shape of said first permanent magnet in said second core member.

12. The permanent magnet rotor type electric motor according to claim 5, wherein said first permanent magnet has a sectional arc shape and is placed to orient the convexity thereof toward the center of said rotor core; and wherein said second permanent magnet is located in a sectional rectangular shape along a direction perpendicular to a diameter line of said rotor core on the inner circumference side of said rotor core, and a pair of flux barrier holes, extending in a slit shape toward the outer circumference of said rotor core along a diameter line of said rotor core, is formed at the ends of said second permanent magnet, said second permanent magnet and the flux barrier holes being arranged within the shadow area of the sectional art shape of said first permanent magnet in said second core member.

13. The permanent magnet rotor type electric motor according to claim 5, wherein said first permanent magnet has a sectional arc shape and is placed to orient the convexity thereof along the outer circumference of said rotor core; and wherein said second permanent magnet is placed in a sectional rectangular shape along a direction perpendicular to a diameter line of said rotor core on the outer circumference side of said rotor core, and a pair of flux barrier holes is formed at the ends of said second permanent magnet, said second permanent magnet and the flux barrier holes being arranged within the shadow area of the sectional art shape of said first permanent magnet in said second core member.

14. The permanent magnet rotor type electric motor according to claim 5, wherein said first permanent magnet has a sectional fan shape; and wherein said second permanent magnet has two second magnet pieces of rectangular cross-section each of which is disposed along an interface between the magnetic poles, and a flux barrier hole is formed between the ends of the two second magnet pieces on the inner circumference side of said core, the two second magnet pieces of said second permanent magnet and the flux barrier hole being arranged within the shadow area of the sectional fan shape of said first permanent magnet in said second core member.

15. The permanent magnet rotor type electric motor according to claim 5, wherein said first permanent magnet has two first magnet pieces of rectangular cross-section each of which is disposed along an interface between the magnetic poles, and a flux barrier hole is formed between the ends of the two first magnet pieces on the inner circumference side of said core; and wherein said second permanent magnet has two second magnet pieces of rectangular cross-section which are arranged at an angle to decrease in space toward the ends of the two second magnet pieces which are oriented toward the center of said rotor core, the two second magnet pieces of said second permanent magnet being respectively arranged within the shadow areas of the two first magnet pieces of said first permanent magnet in said second core member.

16. The permanent magnet rotor type electric motor according to claim 5, wherein said first permanent magnet has two first magnet pieces of rectangular cross-section which are arranged at an angle to decrease in space toward the ends of the two first magnet pieces which are oriented toward the center of said rotor core, and a flux barrier hole is formed between the ends of the two first magnet pieces on the inner circumference side of said core; and wherein said second permanent magnet has two second magnet pieces of rectangular cross-section which are arranged at an angle to decrease in space toward the ends of the two second magnet pieces which are oriented toward the center of said rotor core, the two second magnet pieces of said second permanent magnet being respectively arranged within the shadow areas of the two first magnet pieces of said first permanent magnet in said second core member.

* * * * *